US006387836B1

(12) United States Patent
Dörr et al.

(10) Patent No.: US 6,387,836 B1
(45) Date of Patent: May 14, 2002

(54) METHOD FOR RENEWED ACTIVATION OF HONEYCOMB-SHAPED CATALYST ELEMENTS FOR DENITRATING FLUE GASES

(75) Inventors: Heinz-Kurt Dörr, St. Ingbert; Georg Koch, Schmelz; Walter Bastuck, Eppelborn-Wiesbach, all of (DE)

(73) Assignee: SaarEnergie GmbH, Saarbrucken (DE)

( * ) Notice: Subject to any disclaimer, the term of this patent is extended or adjusted under 35 U.S.C. 154(b) by 0 days.

(21) Appl. No.: 09/230,592

(22) PCT Filed: Jun. 8, 1998

(86) PCT No.: PCT/DE98/01540

§ 371 Date: Mar. 8, 1999

§ 102(e) Date: Mar. 8, 1999

(87) PCT Pub. No.: WO98/55230

PCT Pub. Date: Dec. 10, 1998

(30) Foreign Application Priority Data

Jun. 6, 1997 (DE) .......................................... 197 23 796

(51) Int. Cl.[7] .......................... B01J 20/34; B01J 38/48; B01J 38/12; B01J 38/02
(52) U.S. Cl. .............................. 502/22; 502/38; 502/56
(58) Field of Search ............................ 502/22, 38, 56

(56) References Cited

U.S. PATENT DOCUMENTS 4,102,980 A * 7/1978 Sasaki et al. ............... 423/239
4,572,903 A   2/1986 Hino et al. .................. 502/55
4,855,115 A * 8/1989 Imanuri et al. ............. 423/239

FOREIGN PATENT DOCUMENTS

| DE | 196 28 212 |   | 1/1998 |
| EP | 0 824 973 |   | 2/1998 |
| JP | 58 030 345 |   | 2/1983 |
| JP | 59 049 849 |   | 3/1984 |
| WO | WO 95/20434 | * | 3/1984 |
| WO | WO 95/20434 |   | 8/1995 |

* cited by examiner

Primary Examiner—Steven P. Griffin
Assistant Examiner—Jonas N. Strickland
(74) Attorney, Agent, or Firm—James Creighton Wray; Meera P. Narasimhan

(57) ABSTRACT

The invention relates to a method for renewed activation of honeycomb-shaped catalyst elements for denitrating flue gases from fossil fuel-fired boiler plants, specially coal-fired boiler plants in large power stations. According to the invention, each catalyst element if mechanically cleaned using oil and water-free compressed air before mounting. Subsequently, each element is subjected to wet chemical cleaning using fully desalinated water and dried with oil and water-free compressed air. The inventive method enables the activity of used catalyst elements to be increased from less than 50% to more than 83% of original activity.

4 Claims, No Drawings

METHOD FOR RENEWED ACTIVATION OF HONEYCOMB-SHAPED CATALYST ELEMENTS FOR DENITRATING FLUE GASES

BACKGROUND OF THE INVENTION

The invention concerns a process for reactivation of honeycomb-constructed catalyst elements for the denitrification of flue gases from fossil fired boiler facilities, especially coal-fired major power plant boiler facilities.

Flue gases from fossil-fired boiler facilities, especially from coal-fired major power plant boiler facilities, must be subjected to a comprehensive cleansing, that is primarily to a dust removal process, desulfurization and denitrification, for reasons of environmental protection.

In this connection, at least in the power plant area, denitrification is usually conducted first, then dust removal is carried out by means of an electrostatic precipitator, and finally desulfurization is implemented in a wet washer by a reaction of the $SO_4^{2-}$ ions with $Ca^{2+}$ ions to $CaSO_4$.

The denitrification of flue gas takes place at temperatures between about 300–400° C. by a reaction of nitrogen oxides ($NO_x$) with ammonia to molecular nitrogen and water.

For attaining a satisfactory rate and degree of transformation, it is indispensable to support the denitrification reaction by suitable catalysts.

For example, the denitrification reactor incorporated into the 770 MW Bexbach bituminous coal power plant operated by the applicant consists of four catalyst levels which are outfitted with a total of three catalyst layers. Each catalyst layer once again consists of a number of individual catalytic elements in the order of magnitude of about 1.4 m high, 2.5 m wide and 1.15 m deep. These catalytic elements are constructed in the form of a honeycomb with a cross section area of about 10 $mm^2$ per honeycomb. In the Bexbach power plant, titanium dioxide-based tungsten-containing catalysts with a further active component, vanadium pentoxide, are in use. For improving the mechanical loading capacity of the elements, calcium-aluminum silicate support fibers are admixed to the titanium dioxide-containing groundmass.

It has become evident in operating the Bexbach power plant that the activity of the catalytic elements has already declined greatly after about twenty thousand operating hours. In addition to the lowered reduction of the nitrogen oxides, an activity diminished in this way leads to increased ammonia slippage, that is, the flue gas leaving the denitrification reactor still contains noticeable amounts of ammonia, which can lead to contamination due to the formation of ammonia salts, as well as to pollution of the fly ash in facility elements connected at the output end, for example in the air heater.

To date, it has therefore been the usual practice to replace used catalytic elements whose activity has declined to a third of the original activity by new ones, or retroactively to provide a further layer of new catalytic elements. Considerable costs arise for power plant operators through reoutfitting, in addition to problems with the elimination of used elements. For example, at present the reoutfitting of a level in the reactor of the Bexbach power plant costs about 6 million DM.

SUMMARY OF THE INVENTION

Underlying invention is thus the object of developing a process through which used catalytic elements can be reactivated and consequently be reused for flue gas denitrification.

This object is accomplished in accordance with the invention in that in the completed state each catalytic element is first subjected to a mechanical cleaning by means of compressed air free of oil and water, thereupon to a wet chemical cleansing by means of completely desalinated water, and then to a drying by means of oil-free and water-free compressed air.

Experiments by the applicant have shown that used catalytic elements with a residual activity under 50% of original activity can be brought once again to over 83% of original activity. The catalytic elements reactivated in this way can be reused, owing to which their service life is significantly increased with corresponding cost reductions for the power plant operator.

The removal of the fly ash deposits in the honeycombs takes place primarily during the cleaning of the catalytic elements by means of compressed air provided in the first treatment stage according to the invention. The free flow cross sections are restored, and moreover, the formation of cementations and consequently of deposits on the reaction surfaces of the catalysts during the subsequent wet chemical processing of the catalyst elements is prevented.

The treatment of the catalyst elements with compressed air appropriately takes place first on the inflow side and then on the outflow side of each individual catalytic element in the horizontal position. In experiments conducted by the applicant, compressed air of about 5 bar was used.

The catalyst elements freed of fly ash in this way are subsequently treated with completely desalinated water in a second cleansing stage in accordance with the process of the invention. It has been shown that deactivated alkaline and earth alkaline compounds, such as sodium oxide, calcium oxide or even calcium sulfate, are chemically or hydromechanically loosened by such a treatment and can be rinsed from the catalytic element. On the basis of the $SO_3$ likewise present in the active surface area of the catalyst elements, sulfurous or sulfuric acid forms in connection with the wet chemical treatment, which then appropriately reacts, for example, with the alkaline oxides mentioned.

According to a further feature of the process of the invention, the wet chemical treatment appropriately takes place in two stages, whereby in a first stage the catalytic elements are primarily flushed out using completely desalinated water and then rinsed out, also with completely desalinated water, in a second treatment stage. Here the chemical reactions for loosening the deposited substances already mentioned take place in the first treatment stage, while these are then rinsed out of the elements in the second treatment stage.

The duration of the wet chemical cleansing stages mentioned can be simply adjusted through the pH value of the eluate resulting in any given case. It has namely been shown that the pH value of the eluate during the first cleansing stage rises continuously, for example from an initial value of 2.0 to the final value of 2.7 which unambiguously points to the chemical reactions on the honeycomb surfaces mentioned. After reaching the constant end value, it is then possible to switch to the second cleaning stage. In this cleansing stage, the pH value of the eluate then drops again from, for example, 2.7 to a constant 1.5, whereupon the end of the cleansing is reached.

Optimal results can be obtained if the two-stage wet chemical cleaning of the catalytic elements is carried out in its inflow area as well as in its outflow area. As has become evident, the average treatment times are about thirty minutes per inflow area and cleansing step.

The drying of the first mechanically, then wet chemically processed catalyst elements finally takes place in the third cleaning stage by means of compressed air free of oil and water. The drying appropriately takes place in two stages whereby first of all the free moisture on the inner surface of the catalyst elements is removed by means of compressed: air in a first drying stage, and then further drying takes place in a second drying stage by means of a warm air stream.

In the experiments conducted by the applicant, the compressed air (ca. 5 bar) was used over a period of about thirty minutes in the first drying stage, while in the second drying stage, the catalytic elements were processed for about twenty-four hours with a warm air current with a temperature of about 55° C.

As was mentioned above, the activity of the used catalyst elements could be raised again from less than 50% of the original activity to more than 83% of the original activity by the treatment of the invention. Chemical examination of a treated honeycomb showed that the deactivated surface layer could be almost completely removed. The alkaline and alkaline earth elements on the surface were also significantly minimized. At the same time, the concentration of the active catalyst elements vanadium pentoxide and tungsten dioxide and the acid honeycomb surface remain preserved. The examination of the chemical composition of the catalytic material also showed that no catalytic toxins are diffused into the inner structure by washing the honeycombs.

The prior drying of the catalyst element to only a small minimal residual moisture moreover has the advantage that no time delay occurs in returning the block to operation as a consequence of subsequent drying of the reactive catalytic elements, and consequently no increased starting heat arises due to an additional drying. First measured values with operation at full load show that approx. 90% of the chemical reaction of $NO_x$ to $N_2$ takes place in the reactivated first catalyst layer in the direction of flow.

The extensive preservation of active catalyst material in connection with the process of the invention permits cleaning the catalytic elements several times until they wear down mechanically.

What is claimed is:

1. Method for renewed activation of honeycomb-shaped catalyst elements for denitration of flue gases from boiler installations heated with fossil materials comprising subjecting the catalyst elements initially to a mechanical cleaning, followed by a two-step wet chemical cleaning by means of water and a drying process by means of air, wherein each catalyst element is disassembled and treated individually, and where the mechanical cleaning is done with oil-free and water-free compressed air and the wet chemical cleaning is done with completely desalted water, and wherein the wet chemical cleaning consists of a first step when each catalyst element is jetsprayed with completely desalted water and a second step in which the catalyst element is subsequently rinsed with completely desalted water wherein a temporal duration of at least the first wet chemical cleaning step is adjusted via, a pH-value of the produced eluate.

2. The method of claim 1, wherein the mechanical cleaning and the wet chemical cleaning of each catalyst element is done on an inflow as well as on an outflow side.

3. The method of claim 1, wherein the drying of the catalyst elements takes place in two steps with a first drying step in which free moisture on the inside surfaces of the catalyst elements is removed by means of compressed air and a second step in which the drying occurs by way of a warm air flow.

4. The method of claim 1, wherein the boiler installations are coal-heated superpower station boiler installations.

* * * * *